(12) United States Patent
Townsley

(10) Patent No.: US 9,540,873 B1
(45) Date of Patent: *Jan. 10, 2017

(54) LATERALLY REPOSITIONABLE ROLLER SHADE

(71) Applicant: David M. Townsley, McKinney, TX (US)

(72) Inventor: David M. Townsley, McKinney, TX (US)

(73) Assignee: MCD Innovations, Inc., McKinney, TX (US)

(*) Notice: Subject to any disclaimer, the term of this patent is extended or adjusted under 35 U.S.C. 154(b) by 101 days.

This patent is subject to a terminal disclaimer.

(21) Appl. No.: 14/097,109

(22) Filed: Dec. 4, 2013

Related U.S. Application Data

(60) Provisional application No. 61/733,669, filed on Dec. 5, 2012.

(51) Int. Cl.
*E06B 3/12* (2006.01)
*E06B 9/56* (2006.01)
*E06B 9/42* (2006.01)

(52) U.S. Cl.
CPC .. *E06B 9/56* (2013.01); *E06B 9/42* (2013.01)

(58) Field of Classification Search
CPC ............... E06B 9/42; E06B 9/68; E06B 9/40; E06B 2009/405; E06B 9/58; B60J 1/205; A47H 15/00; A47H 15/02; A47H 15/04; A47H 5/06
USPC .......................... 160/243, 246, 343, 341, 242
See application file for complete search history.

(56) References Cited

U.S. PATENT DOCUMENTS

| | | | | |
|---|---|---|---|---|
| 1,056,315 A * | 3/1913 | Balazs | ...................... | A47H 5/06 160/343 |
| 1,812,881 A * | 7/1931 | Kirsch | ...................... | A47H 5/06 248/262 |
| 1,823,909 A * | 9/1931 | Meier | ............................ | 160/343 |
| 2,801,690 A * | 8/1957 | Bennett | ...................... | A47H 5/06 160/343 |
| 3,003,552 A * | 10/1961 | Eilenberger | ............. | A47H 5/06 160/331 |
| 3,208,507 A * | 9/1965 | Breen | ...................... | E06B 9/364 160/168.1 V |
| 3,400,425 A * | 9/1968 | Polizzi | ...................... | A47H 5/06 16/95 D |
| 3,774,665 A * | 11/1973 | Bourne | ......................... | 160/343 |
| 4,023,609 A * | 5/1977 | Rosenquist | ................... | 160/343 |
| 4,305,448 A * | 12/1981 | Stoll | .............................. | 160/331 |
| 4,766,941 A * | 8/1988 | Sloop | ........................ | E06B 9/24 160/241 |
| 4,832,104 A * | 5/1989 | De Labarthe et al. | ........ | 160/343 |
| 4,926,922 A * | 5/1990 | Shimazaki | ..................... | 160/331 |
| 4,979,775 A * | 12/1990 | Klose | ............................ | 296/97.1 |
| 5,070,927 A * | 12/1991 | Chen | ........................ | A47H 5/06 160/171 |
| 5,135,279 A * | 8/1992 | Beatty | ...................... | B60J 1/205 160/171 |

(Continued)

*Primary Examiner* — Katherine Mitchell
*Assistant Examiner* — Johnnie A Shablack
(74) *Attorney, Agent, or Firm* — Elizabeth Philip Dahm; Kelly J. Kubasta; Ferguson, Braswell & Fraser, P.C.

(57) ABSTRACT

A roller shade may be retracted and extended. In various implementations, when a roller shade is extended it may be laterally repositioned. The roller shade may include a track and a travelling member.

20 Claims, 4 Drawing Sheets

(56) References Cited

U.S. PATENT DOCUMENTS

| | | | | |
|---|---|---|---|---|
| 5,899,255 | A * | 5/1999 | Petracini | A47H 5/06 16/87.6 R |
| 6,004,298 | A * | 12/1999 | Levander | A61M 5/2448 604/211 |
| 6,024,156 | A * | 2/2000 | Chu | 160/331 |
| 6,460,593 | B1 * | 10/2002 | Floyd | 160/370.22 |
| 7,621,313 | B2 * | 11/2009 | Pham | 160/250 |
| 7,694,711 | B2 * | 4/2010 | Okachi et al. | 160/245 |
| 7,810,544 | B2 * | 10/2010 | Spiess | 160/242 |
| 8,025,088 | B2 * | 9/2011 | Kim | 160/120 |
| 8,167,020 | B2 * | 5/2012 | Shanahan | E06B 7/24 160/122 |
| 8,550,142 | B2 * | 10/2013 | Gaskill et al. | 160/121.1 |
| 8,757,239 | B2 * | 6/2014 | Colson | A47H 2/00 160/170 |
| 9,095,907 | B2 * | 8/2015 | Mullet | E06B 9/72 |
| 9,095,908 | B2 * | 8/2015 | Mullet | E06B 9/72 |
| 2009/0173454 | A1 * | 7/2009 | Cheng | 160/120 |
| 2013/0098564 | A1 * | 4/2013 | Jang | 160/120 |
| 2014/0076503 | A1 * | 3/2014 | Mullet et al. | 160/84.02 |
| 2014/0076505 | A1 * | 3/2014 | Mullet et al. | 160/108 |
| 2014/0076508 | A1 * | 3/2014 | Mullet | E06B 9/72 160/310 |
| 2014/0158312 | A1 * | 6/2014 | Townsley | 160/243 |
| 2015/0107788 | A1 * | 4/2015 | Mullet et al. | 160/405 |
| 2015/0272370 | A1 * | 10/2015 | Mullet | E06B 9/72 29/428 |
| 2016/0130865 | A1 * | 5/2016 | De Muelenaere | E04F 10/10 160/113 |

\* cited by examiner

LATERALLY REPOSITIONABLE ROLLER SHADE

CROSS-REFERENCE TO RELATED APPLICATION

This application claims priority to U.S. Provisional Patent Application No. 61/733,669 entitled "SWAY SHADE ROLLER MECHANISM", filed on Dec. 5, 2012, which is hereby incorporated by reference for all purposes.

TECHNICAL FIELD

The present invention relates to roller shades.

BACKGROUND

Roller shades may include, but are not limited to, shades that provide shade, privacy, and/or light filtering.

SUMMARY

In various implementations, a roller shade may include a first end and a second opposing end. The roller shade may include a first member, which includes a track, and a traveling member adapted to follow the track. The track may include a groove. The roller shade may include a shade disposed proximate a first end and coupled to the travelling member such that extending the shade allows lateral repositioning of the shade.

Implementations may include one or more of the following. The first member may include a tube. The groove of the track may be disposed in the tube. The traveling member may include a collar and a pin at least partially disposed in the collar. The pin may move along the groove of the track to allow lateral repositioning of the shade. The roller shade may include a second member. The second member may include a tube. The second member may be coupled to the shade. The first member may be disposed at least partially in the second member. In some implementations, the roller shade may include a third member, which may include a tube. The tube of the third member may include a cutout. Laterally repositioning the shade may include allowing the second member to rotate and move laterally by following the cutout in the third tube. The lateral repositioning of the shade may include moving the shade towards the second end of the roller shade.

In various implementations, a roller shade movement device may include a first member and a travelling member. The first member may include a track, which includes a groove. The traveling member may include a pin. The pin may be adapted to follow the groove of the track such that a shade of a roller shade coupled to the traveling member moves in the direction of the traveling member.

Implementations may include one or more of the following features. The first member may include a tube. The groove of the track may be formed in the tube. The travelling member may include a collar and a pin at least partially disposed in the collar. The pin may follow the groove of the track to allow lateral repositioning of the shade. The roller shade may include a second member, which may include a tube. The second member may be coupled to the shade. The first member may be disposed at least partially in the second member. The roller shade may include a third member, which includes a tube. The tube of the third member may include a cutout. Laterally repositioning the shade may include allowing a second member coupled to the shade to rotate and move laterally by following the cutout in the third tube. Allowing the pin to move along the track may allow lateral repositioning of the shade.

In various implementations, a method of extending a shade of a roller shade may include extending a roller shade, and allowing a shade of the roller shade to move towards an end of the roller shade using a traveling member coupled to the shade. The traveling member may follow a groove of a track of the roller shade. Allowing the shade to move towards an end of the roller shade may include allowing a tube coupled to the shade to rotate. In some implementations, allowing the shade to move towards an end of the roller shade may include allowing a tube coupled to the shade to rotate and allowing a pin of a travelling member to follow a groove when the tube is allowed to rotate. In some implementations, allowing the shade to move towards an end of the roller shade may include allowing a tube coupled to the shade to rotate and extending the material of the shade by allowing the tube to rotate. Allowing the shade to move towards an end of the roller shade may include allowing a first tube coupled to the shade to rotate. An inner tube may be allowed to rotate about a track by allowing the first tube to rotate. The first tube may be allowed to move laterally and the shade may be repositioned by allowing the inner tube to rotate about a track. In some implementations, extending the roller shade comprises pulling a shade down.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

In various implementations, roller shades may be, but not limited to being, used for windows and/or doors. A roller shade may allow a shade to be rolled up and down and at the same time allow left or right travel of the shade. Allowing the shade to move left or right may facilitate covering odd shaped windows, in some implementations.

Figure 1:
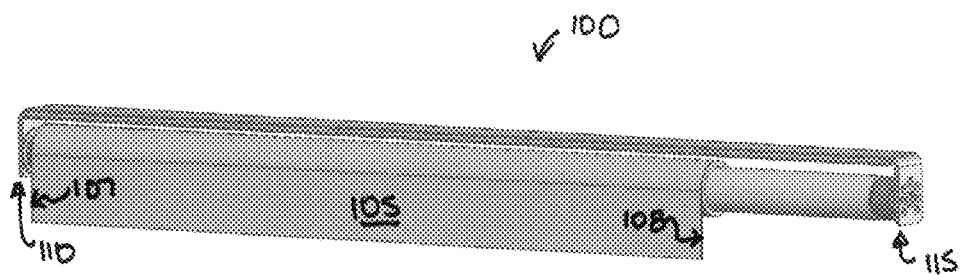
FIG. 1 illustrates an implementation of an example retracted roller shade.

FIG. 1 illustrates an implementation of an example roller shade 100. The roller shade may include a shade 105. The shade may include a first end 107 and a second opposing end 108. The roller shade 100 includes a first end 110 and a second opposing end 115.

As illustrated, the shade 105 of the roller shade 100 may be retracted. When the shade 105 of the roller shade 100 is retracted, it may be proximate a first end. As illustrated, when the shade 105 is retracted, an end 107 of the shade 105 may be disposed on the left side of the roller shade.

Figure 2:
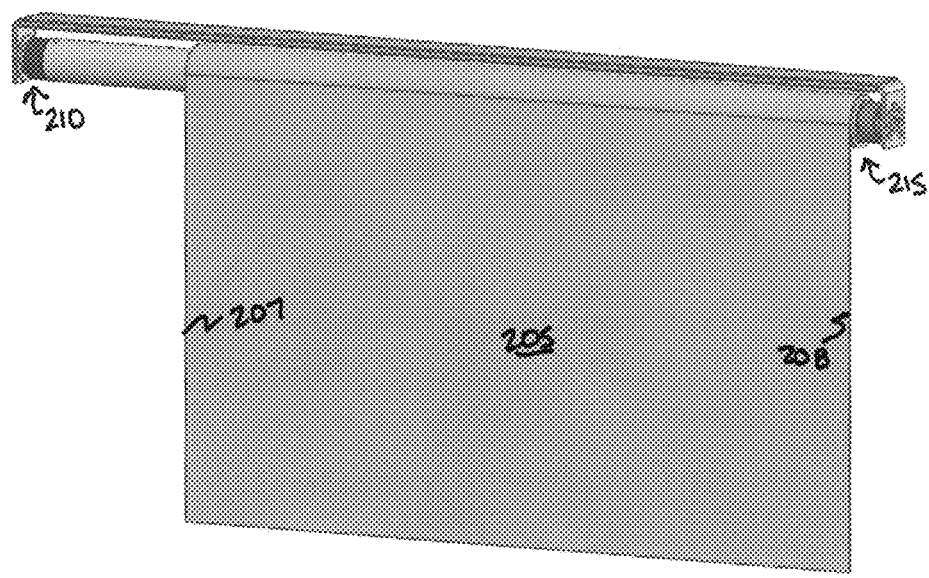
FIG. 2 illustrates an implementation of an example extended roller shade.

FIG. 2 illustrates an implementation of an example roller shade 200. The roller shade 200 may include a shade 205. The shade 205 may include a first end 207 and a second opposing end 208. The roller shade 200 may include a first end 210 and a second opposing end 215. As illustrated, the shade 205 of the roller shade 200 may be extended. When the shade 205 is extended, the shade may travel towards the second end 215 of the roller shade 200. As illustrated, a second end 208 of the shade 205 may be proximate the second end 215 of the roller shade 200. For example, as illustrated, when the shade 205 is extended the shade may travel towards the right.

Figure 3A:
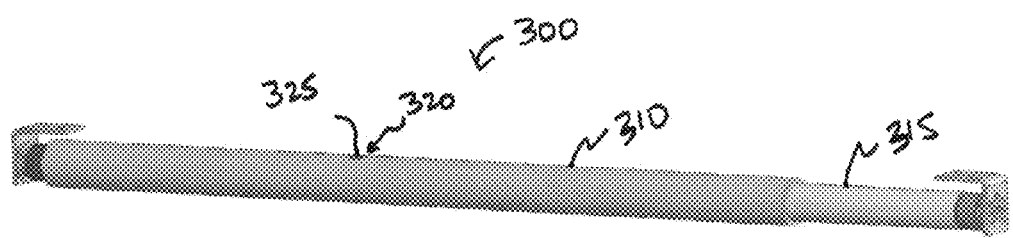
FIG. 3A illustrates an implementation of an example roller shade.
Figure 3B:
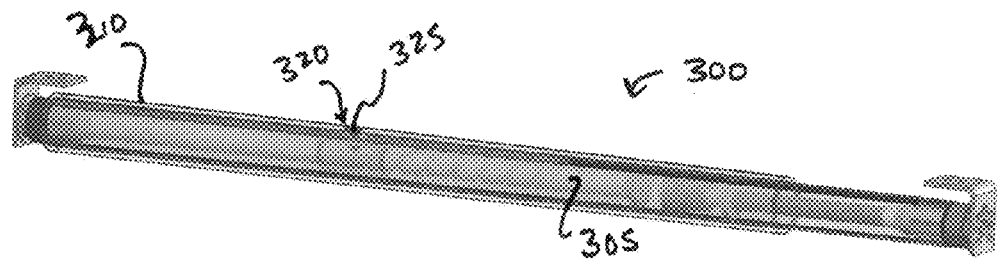
FIG. 3B illustrates a cutaway view of the example roller shade 300, illustrated in FIG. 3A.
Figure 3C:
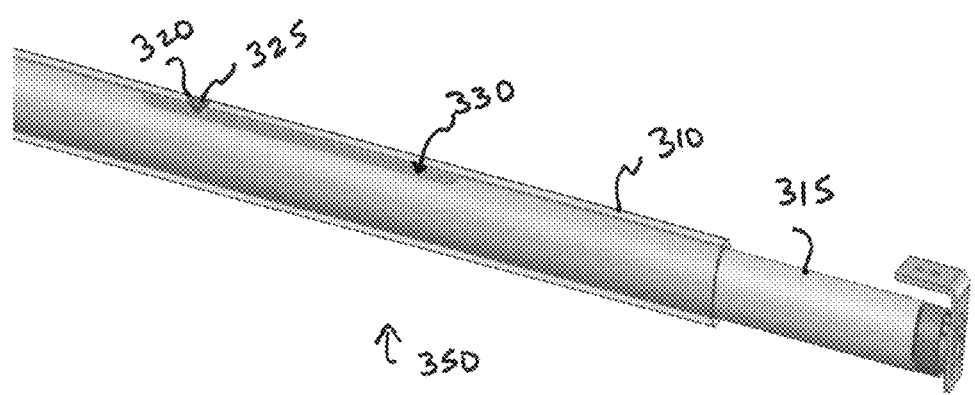
FIG. 3C illustrates an implementation of a portion of the example roller shade 300, illustrated in FIG. 3A.
Figure 3D:
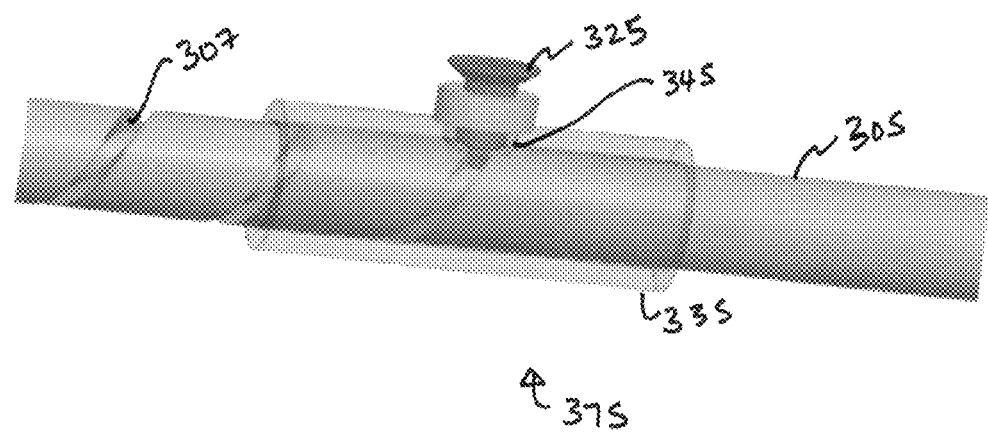
FIG. 3D illustrates an implementation of a portion of the example roller shade 300, illustrated in FIG. 3A.

FIG. 3A illustrates an implementation of an example roller shade 300. FIG. 3B illustrates an implementation of a cutaway view of the example roller shade 300 of FIG. 3A. FIG. 3C illustrates a first portion 350 of the roller shade 300. FIG. 3C illustrates a second portion 375 of the roller shade movement device of the roller shade 300.

As illustrated, the roller shade 300 includes a first member 305, a second member 310, and a third member 315. The first member 305, the second member 310, and/or the third member 315 may include tube(s). The first member 205 may be disposed at least partially in the second member 210 and the third member 215. The third member 315 may be disposed at least partially in the second member 310.

The first member 305 may include a track. The track may include a groove 307 in the first member 305, as illustrated. The track may be helix shaped.

The second member 310 may include an opening 320 to receive a fastener, such as a pin 325 (e.g., screw). The pin 325 may couple the second member 310 to the third member 315. The third member 315 may include a recess, such as a cutout 330. The pin 325 may be at least partially disposed in the opening 320 of the second member 310 and the cutout 330 of the third member.

The roller shade 300 may include roller shade movement device that includes a traveling member 335. The roller shade movement device may allow the shade of the roller shade to be extended and move laterally concurrently. The traveling member may include a collar 340 and a fastener, such as pin 325. The collar 340 may include an opening 345 to receive the pin 325. The pin 325 may follow the groove 307 of the first member 305 when the shade of the roller shade is rotated (e.g., when extending and/or retracting the shade). The collar 340 may follow the groove 307 in the first member 305. The collar 340 may be coupled (e.g., secured) to the second member 310, as illustrated in FIG. 3C.

As the shade is extended (e.g., pulled down), the second member 310 may extend the fabric, as illustrated in FIGS. 1 and 2. The rotation of the second member 310 may cause third member 315 to rotate. Rotation of the third member 315 may cause the second member 310 to move to laterally reposition the extended shade. As illustrated in FIG. 2, laterally repositioning the extended shade may cause the shade to move towards a second end of the roller shade.

Figure 4A:
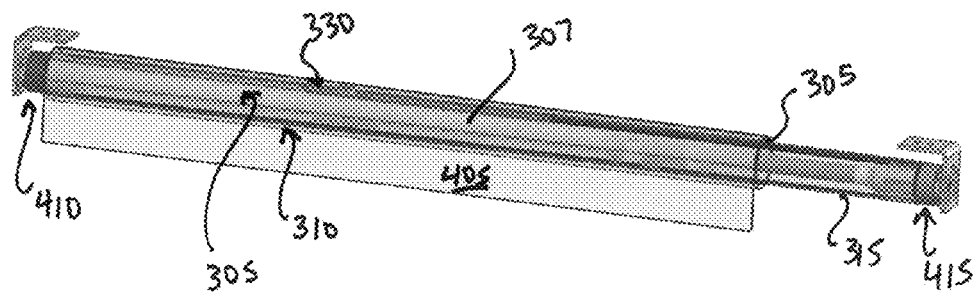
FIG. 4A illustrates an implementation of an example roller shade 400.
Figure 4B:
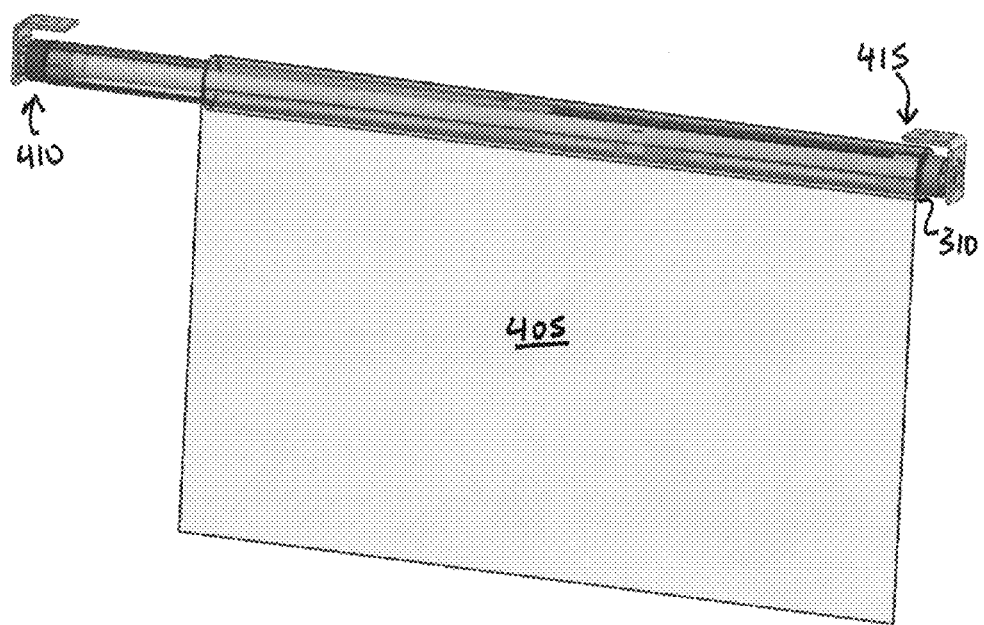
FIG. 4B illustrates an implementation of the example roller shade 400, illustrated in FIG. 4A.

FIG. 4A illustrates an implementation of an example roller shade 400. FIG. 4B illustrates an implementation of the example roller shade 400, illustrated in FIG. 4A.

The roller shade 400 may include a first member 305, second member 310, third member 315, and roller shade movement device. The roller shade movement device may allow the shade 405 of the roller shade to rotate and move laterally concurrently. The roller shade movement device may include a track (e.g., groove 307) and a traveling member 380. The traveling member 380 may include a pin 325.

The shade 405 may be coupled to the second member 310. As illustrated, the roller shade 400 may be retracted (e.g., FIG. 4A) and/or extended (e.g., FIG. 4B). When the shade 405 is retracted, the shade may be disposed proximate a first end 410 of the roller shade 400. When the shade 405 is extended, the shade may move towards an opposing second end 415 of the roller shade 400.

Extending the material of the shade 405 (e.g., pulling the shade from the retracted position) may cause the second member 310 to rotate. When the second member 310 rotates, the shade 405 may be extended (e.g., since the shade is coupled to the second member, as illustrated). The pin 325 of the roller shade movement device may be coupled to the second member 310 and may be in the groove 307 (e.g., a stationary helical groove) of the first member 305. As the second member 310 rotates, the pin 325 in the groove 307 of the first member 305 causes the second member 310 to move laterally (e.g., towards a second end of the roller shade) by following the cutout 330 in the third tube 315 and guided by the collar 340.

Although directions have been described with relation to sides and/or movement, the roller shade may be oriented in any appropriate manner. For example, the roller shade may be disposed horizontally, vertically, and/or at an angle.

Lateral and/or longitudinal adjustment of a shade may be relative to the roller shade or portions thereof (e.g., relative to the first member). For example, lateral adjustment may be along an axis approximately parallel to the axis disposed along a length of at least a portion of the roller shade and/or portions thereof (e.g., the first member, second member, and/or third member). Longitudinal adjustment may be along an axis approximately perpendicular to the axis disposed along a length of at least a portion of the roller shade and/or portions thereof (e.g., the first member, second member, and/or third member).

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a tube" includes a combination of two or more tubes and reference to "a roller shade" includes different types and/or combinations of roller shades.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A roller shade assembly comprising:
   a first end;
   a second opposing end;
   a first member comprising a track, wherein the track comprises a groove;
   a traveling member adapted to follow the track; and
   a second member, wherein the first member is disposed partially in the second member, and wherein the second member comprises:
      a recess extending at least partially along a length of the second member, wherein at least a portion of the travelling member is disposed in the recess;
      and wherein the second member rotates and the traveling member moves along the recess as the travelling member follows the track in the first member; and
   a shade coupled to the second member, wherein the shade is disposed proximate the first end of a roller shade and indirectly coupled to the traveling member such that extending the shade allows lateral repositioning of the shade.

2. The roller shade of claim 1 wherein the first member comprises a tube.

3. The roller shade of claim 1 wherein the first member comprises a tube, and wherein the groove of the track is in the tube.

4. The roller shade of claim 1 wherein the traveling member comprises:
   a collar; and
   a pin at least partially disposed in the collar;
   wherein the pin moves along the groove of the track to allow lateral repositioning of the shade.

5. The roller shade of claim 1 wherein the second member comprises a tube.

6. The roller shade of claim 1 wherein the second member comprises a tube; and further comprising:
   a third member comprising a tube, wherein the tube of the third member comprises a cutout, and wherein laterally repositioning the shade comprises allowing the second member to rotate and move laterally by following the cutout in the third tube.

7. The roller shade of claim 1 wherein lateral repositioning of the shade comprises moving the shade towards the second end of the roller shade.

8. The roller shade of claim 1 wherein the traveling member comprises a pin, and wherein the pin is adapted to follow the groove of the track such that a shade of a roller shade coupled to the traveling member moves in the direction of the traveling member.

9. The roller shade of claim 1 further comprising a third member comprising a tube, wherein the tube of the third member comprises a cutout, and wherein laterally repositioning the shade comprises allowing the second member coupled to the shade to rotate and move laterally by following the cutout in the third tube.

10. The roller shade of claim 1 wherein the traveling member comprises a collar, and wherein the collar follows the groove in the first member; and wherein the collar is coupled to the second member.

11. The roller shade of claim 1 wherein rotating the second member causes rotation of the first member, wherein rotation of the first member laterally repositions the shade.

12. The roller shade of claim 1 wherein the groove is a helical groove.

13. The roller shade of claim 1 wherein the track at least partially circumscribes the first member.

14. The roller shade of claim 1 wherein a shade is coupled to the traveling member such that retracting the shade allows lateral repositioning of the shade.

15. The roller shade of claim 1 wherein the traveling member comprises a pin.

16. The roller shade of claim 15 wherein allowing the pin to move along the track allows lateral repositioning of the shade.

17. A roller shade assembly comprising:
   a first end;
   a second opposing end;
   a first member comprising a track, wherein the track comprises a groove;
   a traveling member adapted to follow the track; and
   a second member discrete from the traveling member, wherein the first member is disposed partially in the second member;
   a third member at least partially disposed in the second member;
   a shade coupled to the second member, wherein the shade is disposed proximate the first end of a roller shade and indirectly coupled to the traveling member such that extending the shade allows lateral repositioning of the shade.

18. The roller shade assembly of claim 17 further comprising a positioner disposed at least partially in the third member, wherein the positioner maintains a position of the shade.

19. The roller shade assembly of claim 17 wherein the roller shade wraps around at least a portion of the third member when the shade is retracted.

20. The roller shade assembly of claim 17 further comprising a first bracket and a second bracket; wherein the first member comprises a first end and a second opposing end; and wherein the third member comprises a first end and a second opposing end; wherein the first end of the first member couples to the first bracket, and wherein the first end of the third member is proximate the second opposing end of the first member, and wherein the second end of the third member couples to the second bracket.

* * * * *